Dec. 11, 1928.  F. M. BOHR  1,695,225
BOOT OR SHOE AND METHOD OF MANUFACTURING SAME
Filed Nov. 26, 1927    2 Sheets-Sheet 2
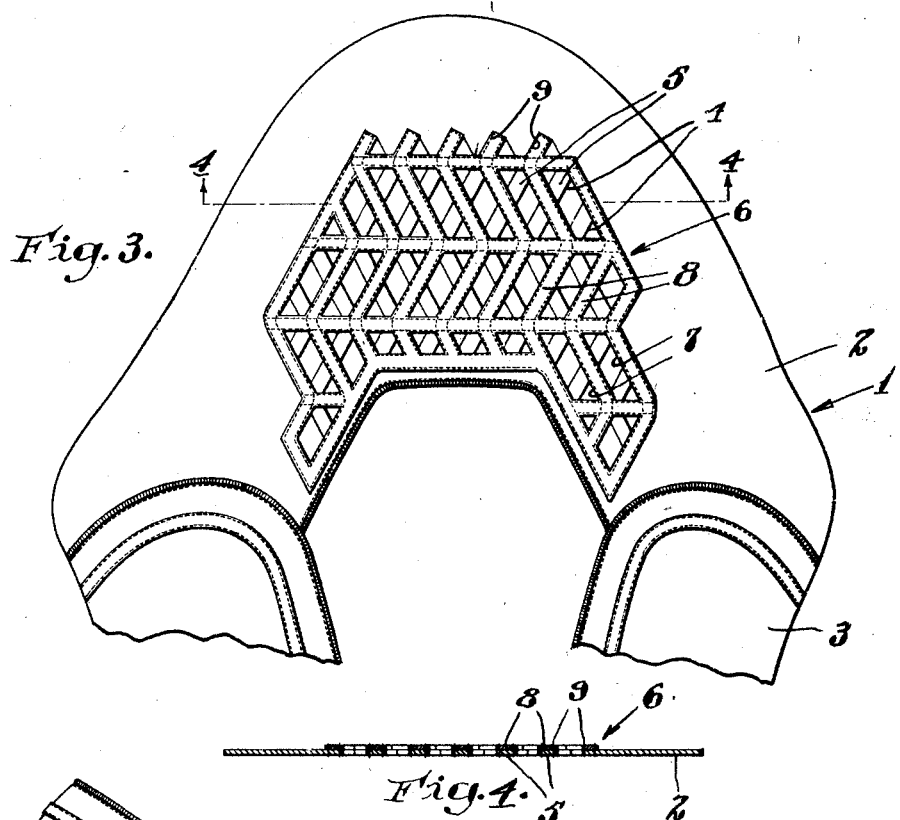
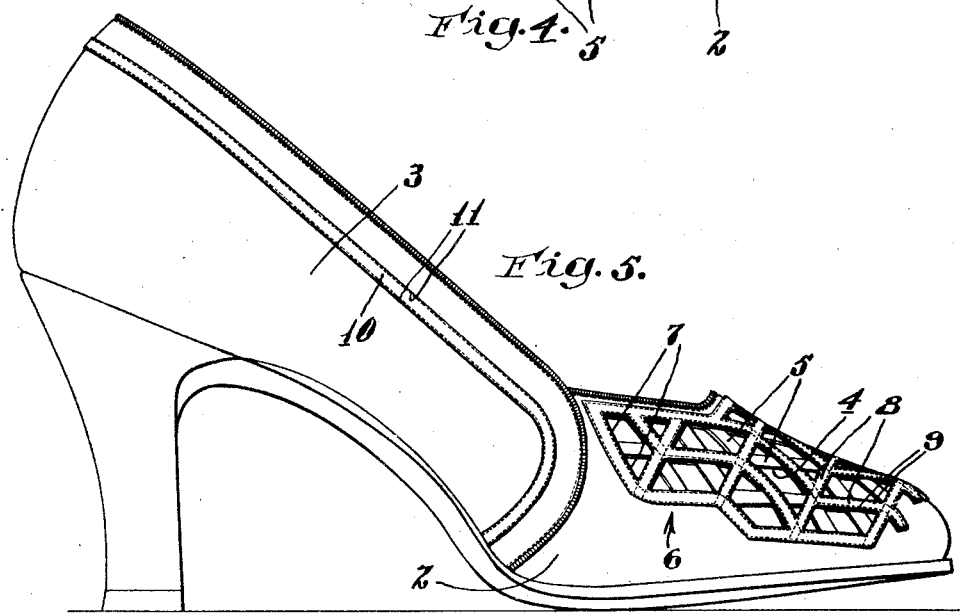
Inventor
Frank M. Bohr
by James R. Hodder
Attorney Patented Dec. 11, 1928.

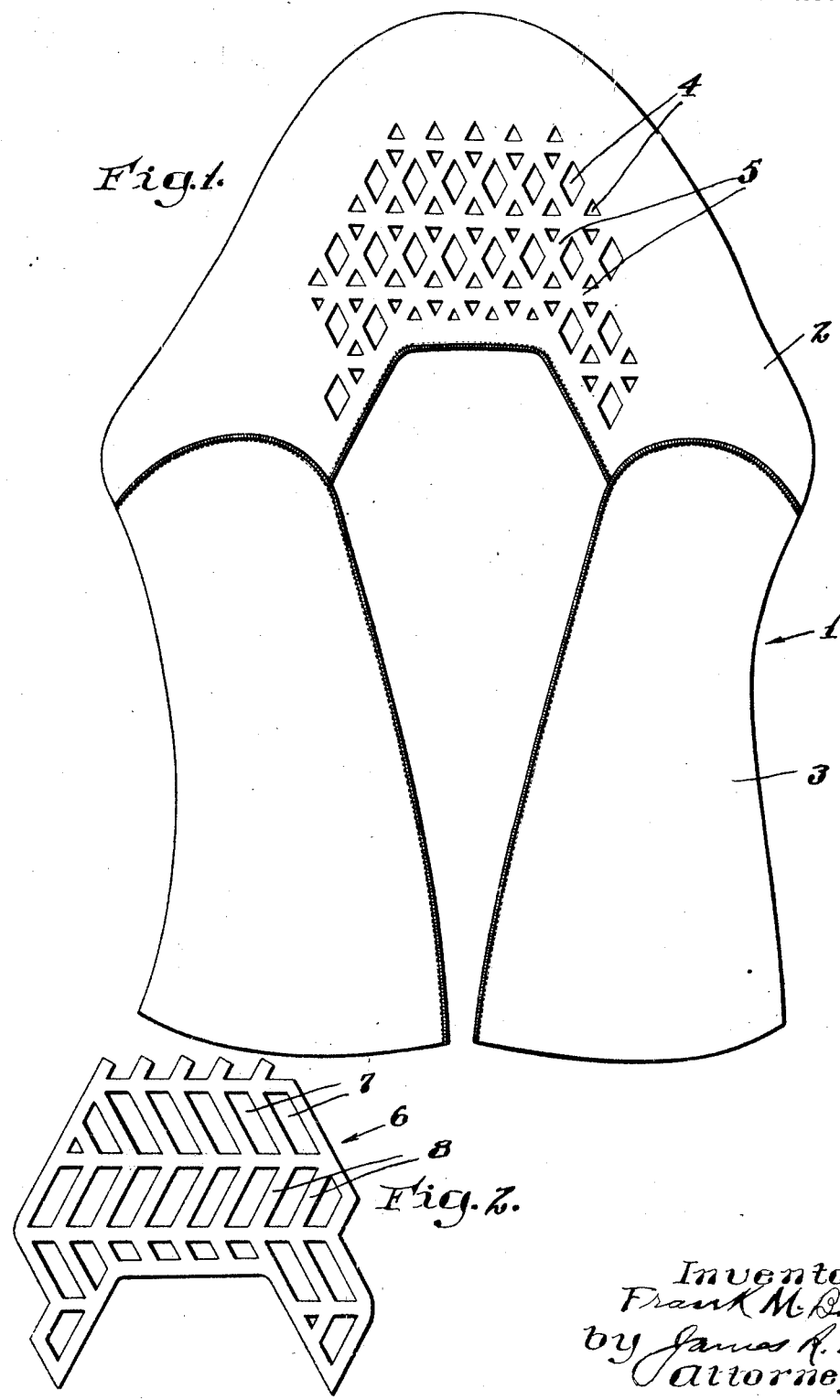

1,695,225

UNITED STATES PATENT OFFICE.

FRANK M. BOHR, OF BOSTON, MASSACHUSETTS.

BOOT OR SHOE AND METHOD OF MANUFACTURING SAME.

Application filed November 26, 1927. Serial No. 235,994.

The present invention relates to boots and shoes, and more particularly to boots or shoes of the cut-out type, and includes a novel method of manufacturing and assembling such shoes.

An important object of the present invention is the provision of a shoe, consisting in upper materials, and a superimposed application or layer of material, preferably of contrasting material or color, cooperating with the upper materials to produce a novel appearance, as well as resulting in a stronger, more lasting and durable shoe.

I may apply the present invention to the vamp of a shoe, or to the quarter, or in fact to any predetermined portion or part of the upper materials of the shoe.

In carrying out the present invention, I first assemble the upper materials in a flat position, and then cut or die out a predetermined portion thereof, providing, on said predetermined portion, an openwork design of predetermined size, shape and contour. I then cut or die, from a separate layer of material, another cut out portion of predetermined size, shape and contour to cooperate with the openwork design already formed in the upper materials. This second cut out layer or application is then applied to the upper materials, being superimposed over the already cut-out design thereon, and is preferably so positioned that every solid part or strap of the superimposed layer is backed up by a solid part or strap of the cut out portion on the upper materials. This superimposed layer is adhered to the upper in any desirable manner, as by cementing, sufficiently to hold the two layers in contacting and cooperating position until permanently united. I preferably utilize stitching as the means of effecting the permanent union, as stitching not only firmly unites the two superimposed layers, viz, the upper and cooperating layer, but also enhances the appearance of the completed shoe, as will be readily appreciated.

Preferably, also, the openwork designs in both the upper materials and the layer to be superimposed thereon, are of such construction that when assembled, the said openwork designs will cooperate to simulate the effect of interweaving, as illustrated in the present drawings.

After assembly of the superimposed layer on the upper materials, and permanent uniting thereof, the said upper materials are then lasted and the shoe completed in usual manner.

It will be appreciated that I am not limited to the open-work design illustrated in the present application, the same being for illustrative purposes only, and the present invention covering any design, form, type or style of cut-out or open-work.

I believe that my present shoe, as above briefly described, is novel, and I have therefore claimed the same broadly in the present application.

I also believe that the process of manufacturing and assembling this shoe is novel, and said process is also claimed broadly herein.

The above and further objects of the invention, details of construction, features and advantages, will be hereinafter more fully pointed out and claimed.

Referring to the drawings, illustrating a preferred embodiment of the present invention, Fig. 1 is a plan view of the upper materials with an open-work design formed on the vamp;

Fig. 2 is a plan view of the openwork layer to be superimposed over the openwork design on the vamp of Fig. 1;

Fig. 3 is a plan view of the vamp of the shoe after union of the superimposed layer therewith;

Fig. 4 is a cross-sectional view on the line 4—4 of Fig. 3; and

Fig. 5 is a side elevation of the completed shoe constructed according to the present invention.

In carrying out my present invention, and as shown in the attached drawings, I first assemble the upper materials, here designated generally at 1, and illustrated as consisting of a vamp 2 and quarter 3, in a flat position. I then form an open-work or cut-out design on any predetermined portion of the upper materials, here shown as on the vamp 2. This openwork design consists of a plurality of open spaces 4 defined by a plurality of solid portions or straps 5. I next form, in a separate layer illustrated generally at 6, another openwork or cut-out design, consisting of a plurality of open spaces 7 defined by a plurality of solid portions or straps 8. Each of the designs on the vamp 2 and the layer 6, are of predetermined configuration, both with regard to the outline, and to the formation of the open spaces and solid portions thereof.

The layer 6 is then superimposed over the openwork design on the vamp 2, in such position that each strap or solid portion 8 is backed up by and rests on a solid portion or strap 5. At the same time certain of the straps 5 will be visible through the open spaces or recesses 7. The layer 6 is secured to the vamp 2 over the openwork design, as by cement, and the thus assembled upper materials and layer 6 are then subjected to a stitching operation, during which operation stitching 9 is run through both the solid portions 8 of the layer 6, and through the solid portions 5 of the vamp 2 under the solid portions 8, thus effecting a permanent union between the two superimposed layers.

It will be seen, from a glance at the drawing, that the openwork design in the vamp differs from the openwork design in the layer 6. Each of these designs is predetermined, and in the present instance they are so constructed and arranged as to impart to the eye the effect of interweaving, although it will be appreciated that the invention is not limited to the particular form of designs illustrated, it being within the range of the invention to utilize any design of cut-out or openwork.

Preferably, also, the layer 6 will be either of a different material from the vamp 2, or of a color to contrast therewith, to enhance the beauty of the shoe and improve the appearance thereof. The stitching 9, being only through the straps or solid portions 8 of the layer 6, and thus leaving certain of the solid portions or straps 5 of the vamp 2 free of said stitching, increases the effect desired, viz, that of simulating interweaving, as well as emphasizing the contrast between the vamp and the layer 6.

After the layer 6 has been thus permanently united with the vamp 2, the upper materials are lasted and the shoe completed in usual manner, producing the completed article as illustrated in Fig. 5.

Around the quarter 3 I have illustrated a strap 10 united thereto by stitching 11, but this is merely for illustrative purposes. It will be appreciated that I may carry out the present invention on the quarter 3 of the shoe with equal facility as on the vamp 2, if desired.

The shoe thus constructed, with each solid portion of the layer 6 reinforced by a solid portion of the vamp, presents, in addition to the features of appearance, a shoe with a great degree of strength in the cut-out portions, resulting in a longer lasting and more durable shoe, and one which will retain its shape at the openwork portions.

The features above described, I believe, are novel with me, and claims to both the shoe as an article of manufacture, and to the process of manufacturing the same are included herein.

While I have necessarily described my present invention somewhat in detail, it will be appreciated that I may vary the size, shape, design and arrangement of parts within reasonably wide limits without departing from the spirit of the invention.

My invention is further described and defined in the form of claims as follows:

1. In a shoe of the kind described, upper materials having an openwork design therein, and a layer having an openwork design therein superimposed on said upper materials over said first openwork design.

2. In a shoe of the kind described, upper materials having an openwork design of predetermined configuration cut therein, a layer having an openwork design of predetermined configuration cut therein and superimposed on said upper over said first openwork design, said two openwork designs cooperating to produce a desired finished appearance.

3. In a shoe of the kind described, upper materials having an openwork design of predetermined configuration cut therein, a layer having an openwork design of predetermined configuration cut therein and superimposed on said upper over said first openwork design and permanently united therewith, said two openwork designs cooperating to produce a desired finished appearance.

4. In a shoe of the kind described, upper materials having an openwork design cut therein, said design comprising solid portions defining open spaces therebetween, a layer having an openwork design cut therein, said second design comprising solid portions defining open spaces therebetween, said layer being superimposed on said upper materials over said first design.

5. In a shoe of the kind described, upper materials having an openwork design cut therein, said design comprising solid portions defining open spaces therebetween, a layer having an openwork design cut therein, said second design comprising solid portions defining open spaces therebetween, said layer being superimposed on said upper materials over said first design and permanently united therewith.

6. In a shoe of the kind described, upper materials having an openwork design cut therein, said design comprising solid portions defining open spaces therebetween, a layer having an openwork design cut therein, said second design comprising solid portions defining open spaces therebetween, said layer being superimposed on said upper materials over said first design and permanently united therewith, said two openwork designs cooperating to produce a desired finished appearance, the open spaces in each of said designs being of different area.

7. In a shoe of the kind described, upper materials having an openwork design cut therein, said design comprising solid portions defining open spaces therebetween, a layer having an openwork design cut therein, said second design comprising solid portions defining open spaces therebetween, said layer being superimposed on said upper materials over said first design and permanently united therewith, said two openwork designs cooperating to simulate interweaving.

8. In a shoe of the kind described, upper materials having an openwork design cut therein, said design comprising solid portions defining open spaces therebetween, a layer having an openwork design cut therein, said second design comprising solid portions defining open spaces therebetween, said layer being superimposed on said upper materials over said first design, each solid portion of said superimposed layer being permanently united to a solid portion of said upper.

9. In a shoe of the kind described, upper materials having an openwork design cut therein, said design comprising solid portions defining open spaces therebetween, a layer having an openwork design cut therein, said second design comprising solid portions defining open spaces therebetween, said layer being superimposed on said upper materials over said first design, each solid portion of said superimposed layer being reinforced by and permanently united with a solid portion of said upper.

10. In a shoe of the kind described, upper materials having an openwork design cut therein, said design comprising solid portions defining open spaces therebetween, a layer having an openwork design cut therein, said second design comprising solid portions defining open spaces therebetween, said layer being superimposed on said upper materials over said first design, each solid portion of said superimposed layer being reinforced by and permanently united with a solid portion of said upper, certain of the solid portions and open spaces of the openwork design in said upper materials being visible through the open spaces in the openwork design in said superimposed layer.

11. The improved process of manufacturing shoes, which consists in assembling upper materials, cutting an openwork design in a predetermined portion thereof, cutting an openwork design in a separate layer, and superimposing said layer on said upper over the first said design.

12. The improved process of manufacturing shoes, which consists in assembling upper materials, cutting an openwork design in a predetermined portion thereof, cutting an openwork design in a separate layer, and superimposing said openwork layer over said first design, and uniting said layer and upper materials.

13. The improved process of manufacturing shoes, which consists in assembling upper materials, cutting an openwork design in a predetermined portion thereof, cutting an openwork design in a separate layer, superimposing said openwork layer over said first design, and permanently uniting said layer and upper materials.

14. The improved process of manufacturing shoes, which consists in assembling upper materials, cutting an openwork design in a predetermined portion thereof, cutting an openwork design in a separate layer, superimposing said openwork layer over said first design, temporarily uniting said layer and said upper materials, and then permanently uniting the same.

15. The improved process of manufacturing shoes, which consists in assembling upper materials, cutting an openwork design in a predetermined portion thereof, cutting an openwork design in a separate layer, and superimposing said openwork layer over said first design in such manner that each solid portion of the said layer will contact with a solid portion of said upper materials.

16. The improved process of manufacturing shoes, which consists in assembling upper materials, cutting an openwork design in a predetermined portion thereof, cutting an openwork design in a separate layer, superimposing said openwork layer over said first design in such manner that each solid portion of the said layer will contact with a solid portion of said upper materials, and uniting said layer and said upper materials.

17. The improved process of manufacturing shoes, which consists in assembling upper materials, cutting an openwork design in a predetermined portion thereof, cutting an openwork design in a separate layer, superimposing said openwork layer over said first design in such manner that each solid portion of the said layer will contact with a solid portion of said upper materials, and permanently uniting said layer and said upper materials by stitching extending through each solid portion of said layer and through each corresponding solid portion of said upper.

In testimony whereof, I have signed my name to this specification.

FRANK M. BOHR.